United States Patent [19]

Howarth

[11] Patent Number: 4,556,976

[45] Date of Patent: Dec. 3, 1985

[54] CHECKING SEQUENTIAL LOGIC CIRCUITS

[75] Inventor: James Howarth, Whitefield, England

[73] Assignee: International Computers Limited, London, England

[21] Appl. No.: 517,643

[22] Filed: Jul. 27, 1983

[30] Foreign Application Priority Data

Aug. 14, 1982 [GB] United Kingdom ............... 8223437

[51] Int. Cl.[4] ............................................. G06F 11/00
[52] U.S. Cl. ....................................... 371/25; 371/60; 371/67
[58] Field of Search ............... 371/23, 24, 25, 26, 371/60, 67; 324/73 R; 364/738

[56] References Cited

U.S. PATENT DOCUMENTS

| 3,633,100 | 1/1972 | Hellweil et al. | 324/73 R |
| 3,851,161 | 11/1974 | Sloop | 371/25 X |
| 3,925,647 | 12/1975 | Louie | 235/153 BB |
| 4,183,459 | 1/1980 | Donn et al. | 371/25 X |
| 4,358,847 | 11/1982 | Susskind | 371/25 |
| 4,423,509 | 12/1983 | Feissel | 371/25 |
| 4,493,078 | 1/1985 | Daniels | 371/25 |

FOREIGN PATENT DOCUMENTS

| 1157033 | 7/1969 | United Kingdom . |
| 1312791 | 4/1973 | United Kingdom . |
| 1473961 | 5/1977 | United Kingdom . |

Primary Examiner—Charles E. Atkinson
Attorney, Agent, or Firm—Lee, Smith & Zickert

[57] ABSTRACT

A sequential logic circuit includes means for checking, while the circuit is in operation, that it is stepping correctly from one state to the next. The current state of the circuit is encoded as X0–X3. That encoded value is compared with a predicted value Y0–Y3 derived in response to the previous state of the circuit itself and those signals that cause the transition from the previous to the current state. If the two do not match the circuit has not stepped to the correct state. Reduction in hardware is achieved by allowing certain states to share the same encoded value.

9 Claims, 2 Drawing Figures

CHECKING SEQUENTIAL LOGIC CIRCUITS

BACKGROUND OF THE INVENTION

This invention relates to checking the operation of a sequential logic circuit.

A sequential logic circuit is a circuit with a plurality of distinct internal states and which changes stage in a predetermined manner in response to one or more condition input signals.

It is often desirable to provide some means for checking the operation of such a circuit during its actual operation to ensure that it is operating correctly. One way of doing this would be to duplicate the entire circuit and to compare the states of the duplicated circuits at each stage of operation. Any discrepancy between the duplicated circuits would indicate an error. However, the disadvantage of this method is that it is very expensive in terms of the amount of hardware required.

One object of the present invention is to provide a novel way of checking a sequential logic circuit which does not require duplication of the circuit.

SUMMARY OF THE INVENTION

According to the invention, there is provided a sequential logic circuit having checking means comprising:

a first encoder responsive to the current state of the circuit, for producing a first code dependent on that state;

a second encoder responsive to the state of the circuit prior to a transition to a different state and also to the signal or signals effective to cause that transition, for producing a second code indicating a predicted value for the first code in the next state; and means for comparing the first code produced in a current state with the second code produced for the transition to that state and indicating if there is any discrepancy between them.

According to another aspect of the invention there is provided a method of checking the operation of a sequential logic circuit, which method comprises:

for a transition from one state of the circuit to a different state deriving in response to the said one state of the circuit and the signal or signals effective to cause that transition a prediction relating to the said next state; and in the said next state determining from the actual state whether the prediction is fulfilled.

Preferably the first and second codes are one-out-of-n codes, i.e. each consists of n bits, one only of which has one predetermined binary value, the rest having the other binary value.

Advantageously some at least of the states of the circuit have the same first code but no two states have the same first code if:

(i) one is the successor of the other, or
(ii) they both have the same predecessor.

As will be seen, this reduces the number of different code values and hence the amount of hardware required for producing the codes.

BRIEF DESCRIPTION OF THE DRAWINGS

A circuit with checking means in accordance with the invention will now be described in greater detail with reference to the accompanying drawings, in which.

DESCRIPTION OF THE PREFERRED EMBODIMENT

An important characteristic of any sequential logic circuit is its state diagram. For the sake of a concrete example it will be assumed that the circuit whose checking means is to be described has the state diagram shown in FIG. 1.

Figure 1:
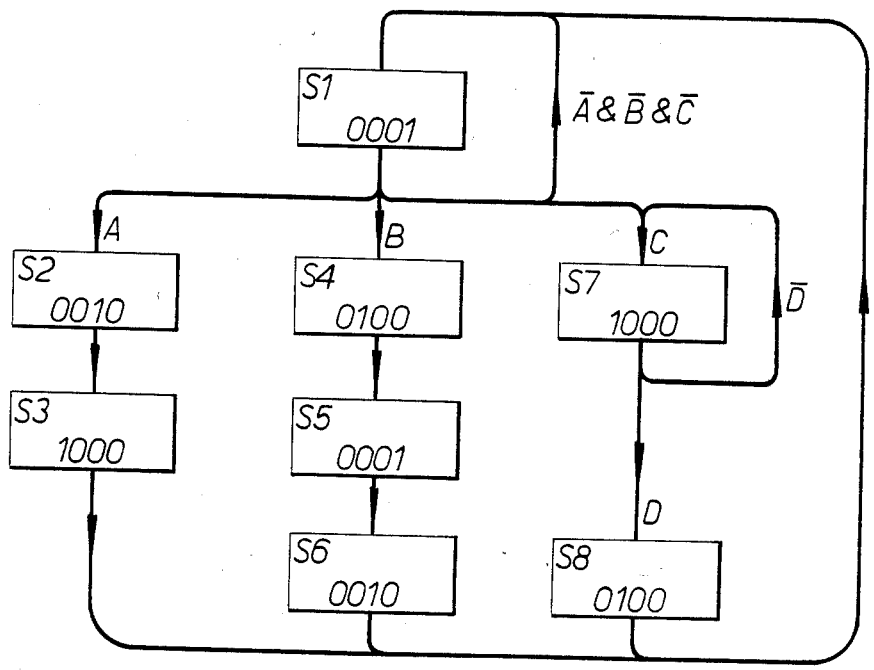
FIG. 1 is a state diagram of the circuit.

Referring to FIG. 1, the circuit has, in this particular example, eight states S1 to S8. The circuit is synchronous and is capable of making a change of state at predetermined instants defined by clock signals. For some states the circuit automatically makes a transition at the next clock signal to a single predetermined successor (e.g. S2 to S3). As an alternative, a state may have several possible successors, the particular transition executed depending on the value of particular condition inputs at the time the clock signal occurs. Thus if the circuit is in state S1 it will change to S2, S4 or S7 depending on which of three signals A, B and C is asserted. In the case of S1 it is possible for none to be asserted at the clock signal. The circuit then remains in state S1 instead of making a transition to a different state. Similarly, if it is in state S7 the circuit will either make a transition to state S8 if a signal D is asserted or remain in the same state if not.

One particular circuit implementation which will yield a state diagram as shown in FIG. 1 has a bistable for each state, only the particular bistable corresponding to a state being set during that state. In that case FIG. 1 may be regarded as a circuit diagram with each box representing a bistable and, as will readily be understood, the necessary gating (not shown) being provided to cause each bistable to trigger the appropriate successor.

Figure 2:
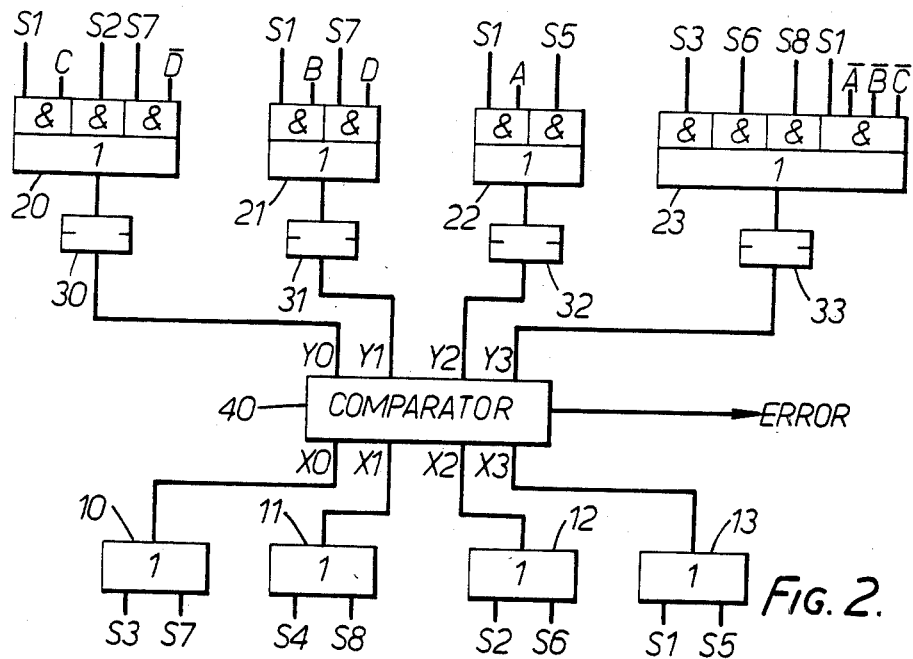
FIG. 2 is a circuit diagram of the checking means.

Referring now to FIG. 2, this shows means for checking the operation of a sequential logic circuit having the state diagram of FIG. 1. The checking means includes an encoder consisting of four OR gates 10–13. These encode the current state of the circuit (input on one of lines S1 to S8) to produce a four-bit output code X0–X3 indicative of this state. With the implementation described above each input S1 etc. may be supplied as a direct input from the "set" output of the corresponding bistable. The codes for the eight states are shown in FIG. 1. For example, it can be seen from FIG. 2 that in state S1, gate 13 is enabled and gates 10–12 are disabled. Hence, $X0 = X1 = X2 = 0$ and $X3 = 1$, so that the code for state S1 is 0001.

It will be observed that each code consists of a one-out-of-four code. Also, the codes for the states are not unique: for example, state S5 has the same code 0001 as state S1. However, it is arranged that no two states which can be reached directly by branching from the same state (i.e. have the same predecessor) are given the same code value. For example, states S2, S4 and S7 which can all be reached by branching from state S1, are assigned different code values 0010, 0100 and 1000. Similarly where one state is the successor of another they have different code values.

The checking means also includes a second encoder consisting of four AND/OR gate combinations 20 to 23 and a register of four bistables 30 to 33. This register is clocked at the time a transition can take place to capture a prediction, output as the four-bit code Y0–Y3, of the code value which will obtain after that time. The prediction is produced by the gate combinations 20 to 23, which receive the state existing up to the transition on the lines S1 to S8 and the condition inputs A to D with their inverses.

For example, if the circuit is in state S1 when the transition can occur and the condition signal C is true, it can be seen from FIG. 2 that gate 20 is enabled and gates 21–23 are disabled. Hence Y0=1 and Y1=Y2=Y3=0. Thus, the encoder correctly predicts that the next state should be state S7 (code 1000). Although state S3 has the same code value, there is no serious ambiguity, since state S3 cannot be reached directly from state S1.

The code X0–X3 corresponding to the present state of the sequential circuit is compared in a comparator 40 with the predicted code Y0–Y3 stored in the bistables 30–33. If these two codes are equal when the comparator is clocked, the output of the comparator 40 remains low, indicating correct operation. However, if there is any difference between the codes, the output of the comparator 40 goes high, indicating an error.

It can be seen that the checking means is capable of detecting that the circuit has not stepped correctly from one state to the next, in particular because of any of the following types of error:

(a) No state
(b) "Multiple" states (i.e. more than one X bit set)
(c) Incorrect branching
(d) Stuck-in-state In addition it will detect wrong action by the checking means, since the X code continues correctly but the Y code predicts an erroneous next state.

It should be noted that the use of a one-out-of-four code (or, more generally, a one-out-of-n code) for encoding the states is preferable to a conventional binary code where each code may contain more than one binary "1", since the latter could mask multiple state errors.

It will be understood that the inputs to the checking circuit shown in FIG. 2 are dependent on the particular state diagram shown in FIG. 1, and must be adjusted for a circuit with a different state diagram to operate in the general way described.

The checking means thus provides a powerful way of checking the operation of the sequential circuit in the cour of operation, without the necessity for duplicating the entire circuit. The number of bistables in the checking means described above is less than the number which would have been required if the sequential circuit (in the implementation described) had been duplicated. This advantage would be even greater for larger sequential circuits having more states. Besides the cost advantage of fewer components it also renders the circuit and checking means especially suitable to be implemented on the same integrated circuit chip, since the checking means occupies a smaller chip area.

The circuit of FIG. 1 may be used, for example, as a sequence controller.

The invention does not require a separate bistable for each state, provided the state is made accessible to the encoders, which will, if the state is not itself supplied as a one-out-of-n code, require additional gating. And the invention may be applied to asynchronous sequential circuits.

I claim:

1. A sequential logic circuit having checking means comprising:
    a first encoder responsive to the current state of the circuit, for producing a first code dependent on that state;
    a second encoder responsive to the state of the circuit prior to a transition to a different state and also to the signal or signals effective to cause that transition, for producing a second code indicating a predicted value for the first code in the next state; and
    means for comparing the first code produced in a current state with the second code produced for the transition to that state and indicating if there is any discrepancy between them.

2. A circuit as claimed in claim 1, in which the first and second codes are one-out-of-n codes.

3. A circuit as claimed in claim 1, in which the circuit comprises a plurality of bistable elements, one for each state, and in each state a different one of the said plurality is in one binary state and the remainder are in the other binary state.

4. A circuit as claimed in claim 1, in which the second encoder comprises:
    logic responsive, at a time a transition can occur, to an indication of the state prior to that time and to any condition signal or signals effective to select between a plurality of alternative possible states for the circuit after that time to output a code value, and
    means for storing the said code value produced at the said time a transition can occur as the said second code to make it available during the succeeding state.

5. A circuit as claimed in claim 1 in which at least some of the circuits have the same first code, but each state has a different first code from its predecessor, and no two states with the same predecessor have the first same code.

6. A method of checking the operation of a sequential logic current, the method comprising, for each transition between two different states of the circuit:
    (a) deriving a first code from the state of the circuit following the transition,
    (b) deriving a second code from the state of the circuit prior to the transition and from a signal or signals which caused that transition, and
    (c) comparing the first and second codes and indicating if there is any discrepancy between them.

7. A method as claimed in claim 6, in which the first and second codes are one-out-of-n codes.

8. A method as claimed in claim 6, in which the circuit comprises a plurality of bistable elements, one for each state, and in each state a different one of the said plurality is in one binary state and the remainder are in the other binary state.

9. A method as claimed in claim 6 in which at least some of the states of the circuit have the same first code, but each state has a different first code from its predecessor, and no two states with the same predecessor have the same first code.

* * * * *